United States Patent [19]

Saito et al.

[11] Patent Number: 5,347,116

[45] Date of Patent: Sep. 13, 1994

[54] APPARATUS FOR RECORDING AND/OR REPRODUCING INFORMATION ON AND/OR FROM OPTICAL RECORD MEDIUM

[75] Inventors: Akito Saito; Tsuyoshi Togawa, both of Hino, Japan

[73] Assignee: Olympus Optical Co., Ltd., Tokyo, Japan

[21] Appl. No.: 787,094

[22] Filed: Nov. 4, 1991

[30] Foreign Application Priority Data

Nov. 6, 1990 [JP] Japan .................. 2-298988

[51] Int. Cl.⁵ .................................. G06K 13/04
[52] U.S. Cl. .......................... 239/479; 235/475
[58] Field of Search ............. 235/475, 476, 477, 479, 235/480; 360/2, 88

[56] References Cited

U.S. PATENT DOCUMENTS 4,800,258 1/1989 Suzuki et al. .................. 235/479

FOREIGN PATENT DOCUMENTS

0305523 3/1989 European Pat. Off. .
0361935 4/1990 European Pat. Off. .
2105372 4/1990 Japan .

*Primary Examiner*—Edward P. Westin
*Assistant Examiner*—S. B. Allen
*Attorney, Agent, or Firm*—Stevens, Davis, Miller & Mosher

[57] ABSTRACT

An apparatus for recording and/or reproducing information on and/or from an optical card including a shuttle for carrying the optical card, an optical head for projecting a writing and/or reading light beam onto the optical card, a linear motor for moving the shuttle in a track direction at a constant speed during the recording and/or reproduction, a linear encoder for detecting a movement of the shuttle in the track direction, and an optical card driving mechanism for inserting the optical card into the shuttle when the shuttle is indexed at a predetermined card loading position. In order to insert the optical card into the shuttle in a positive and correct manner, the movement of the shuttle from the card loading position is detected by counting pulses generated by the linear encoder, and when it is detected that the shuttle is moved, the linear motor is actuated such that the shuttle is moved back into the card loading position.

9 Claims, 7 Drawing Sheets

FIG_3
PRIOR ART

FIG_4
PRIOR ART

FIG_5

FIG_6

FIG_7

FIG_8

APPARATUS FOR RECORDING AND/OR REPRODUCING INFORMATION ON AND/OR FROM OPTICAL RECORD MEDIUM

BACKGROUND OF THE INVENTION

1. Field of the Invention

The present invention relates to an apparatus for recording and/or reproducing information on and/or from an optical record medium such as optical card, optical disk and magneto-optic disk.

2. Description of the Related Art

Heretofore, there have been proposed various kinds of apparatuses for recording and/or reproducing information on and/or from an optical record medium by projecting a writing or reading light beam onto the optical record medium.

In an optical card information recording and/or reproducing apparatus, after an optical card has been inserted into the apparatus, the optical card is moved over a given distance in a track direction which is parallel to a direction in which parallel information tracks formed on the optical card extend so that information is recorded and/or reproduced on and/or from a track, and then after the optical head has been moved in a direction perpendicular to the track direction, information is again recorded and/or reproduced in a track by moving the optical card in the track direction. In this manner, the information is recorded on the optical card or the information is reproduced from the optical card.

Figure 1:
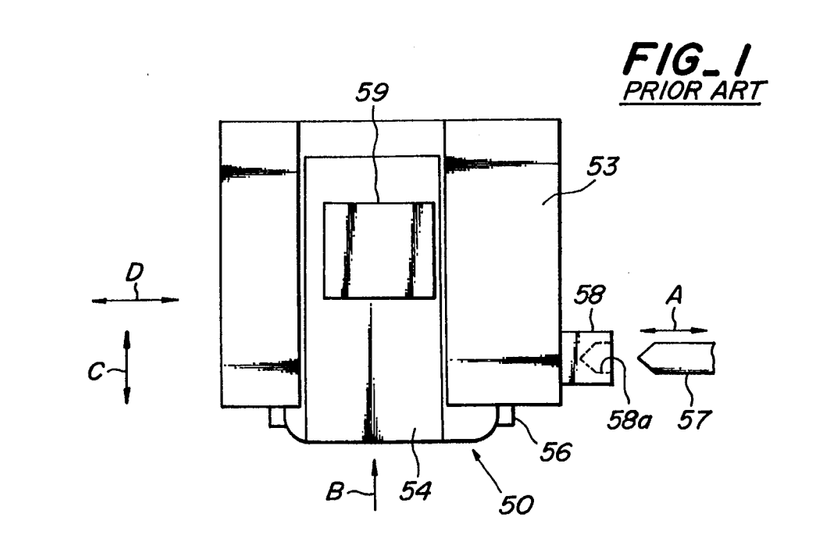
FIG. 1 is a plan view showing the construction of the known optical card supporting shuttle.
Figure 2:
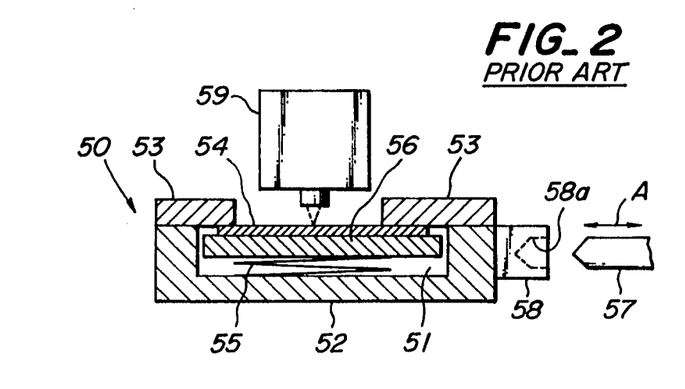
FIG. 2 is a cross sectional view of the known shuttle shown in FIG. 1.

In the information recording and/or reproducing apparatus using the optical card, there is usually provided an optical card carrying means usually called a shuttle. FIGS. 1 and 2 are plan and front views illustrating the construction of a known shuttle. A shuttle 50 comprises a card receiving plate 52 having a recess 51 formed therein, a card holding plate 53, a card pushing plate 56 arranged in said recess 51 and a spring 55 inserted between the card receiving plate 52 and the card pushing plate 56. On a side wall of the card holding plate 52 there is secured a pin receptacle 58 which can receive a locking pin 57. The locking pin 57 is moved as shown by a double headed arrow A by a solenoid not shown. When the locking pin 57 is inserted into a hole 58a formed in the pin receptacle 58, the shuttle 50 is locked at a card loading position at which the optical card 54 is inserted into the shuttle. Usually the optical card is discharged from the shuttle at this position, but this position is termed as the card loading position for sake of simplicity. When an optical card 54 is inserted into the shuttle 50 in a direction shown by an arrow B in FIG. 1, a front edge of the optical card is inserted in a space formed between the card pushing plate 56 and the card holding plate 53, and the optical card 54 is resiliently urged against a rear surface of the card holding plate 53 by means of the spring 55 and card pushing plate 56. After the optical card 54 has been fully inserted into the shuttle 50, the locking pin 57 is removed from the hole 58a of the pin receptacle 58 and then the shuttle can be moved in the track direction C relative to an optical head 59 arranged above the shuttle. The optical head 59 is moved in a direction D perpendicular to the track direction C in order to index a desired track on the optical card 54.

Optical card carrying shuttle of the kind mentioned above in which the shuttle is mechanically locked when the optical card is inserted into the shuttle have been disclosed in various publications. For instance, the shuttle locking mechanism has been disclosed in U.S. Pat. No. 4,800,258.

Figure 3:
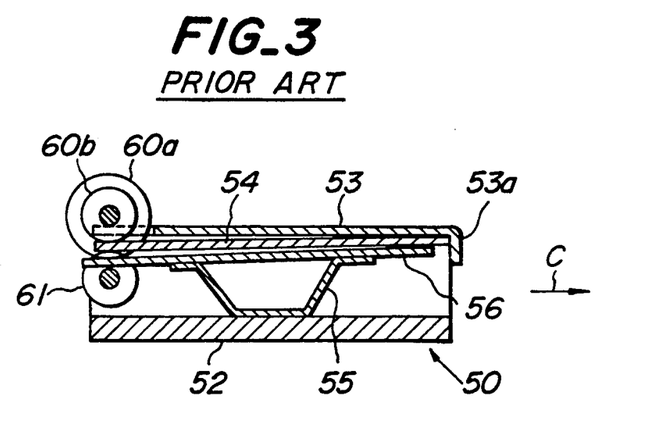
FIGS. 3 and 4 are cross sectional views illustrating the optical card inserting operation in the known shuttle.
Figure 4:
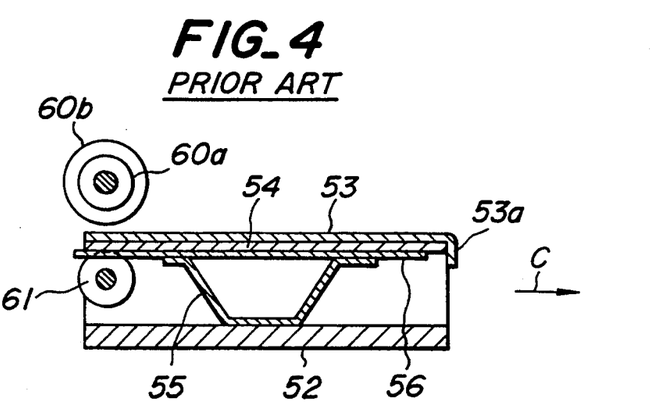

In the above mentioned shuttle, when the optical card is inserted into the shuttle, the shuttle is mechanically locked at the predetermined card loading position due to the following reason. FIGS. 3 and 4 show conditions of the shuttle when the optical card 54 is inserted into the shuttle 50. The card holding plate 53 is secured to the card receiving plate 52 and the card pushing plate 56 is urged against the card holding plate 53 by means of the spring 55. When the optical card 54 is inserted into the shuttle 50, a push roller 30a and guide roller 30b are moved downward and the card pushing plate 56 is pushed downward against the force of the spring 55 to form a space between the card pushing plate 56 and the card holding plate 53 as shown in FIG. 3. At the same time, the optical card 54 is clamped between the guide roller 60a and a feed roller 61, and is inserted into the space formed between the card pushing plate 56 and the card holding plate 53. In this case, the shuttle 50 is subjected to a force directing to the inserting direction of the optical card 54, and if the shuttle is freely moved in this direction, the optical card could not be correctly inserted into the shuttle due to a frictional force generated between the optical card 54 and the card holding plate 53 and card pushing plate 56. Therefore, the shuttle 50 has to be locked at the card loading position such that the optical card 54 can be inserted into the shuttle correctly. As depicted in FIG. 4, when the optical card 54 has been fully inserted into the shuttle 50 such that the front edge of the optical card is urged against an edge 53a of the card holding plate 53, an electrical switch not shown is made off and the locking pin 57 is removed from the pin receptacle 58. At the same time, the rollers 60a and 60b are moved upward. Then, the shuttle may be moved in the track direction C with respect to the optical head 59.

In the known optical card apparatus, there is provided only the locking mechanism for fixing the shuttle at the card loading position at which the optical card is inserted into the shuttle by inserting the locking pin into the receptacle secured to the shuttle, and after the optical card has been completely inserted into the shuttle, the locking pin is removed from the receptacle. However, if the operation for inserting the locking pin into the receptacle is not performed correctly due to the malfunction of the solenoid for driving the locking pin, the shuttle could not be locked at the card loading position, so that the optical card could not be correctly inserted into the shuttle and the recording and/or reproduction could not be performed correctly. A similar drawback occurs when the shuttle is not indexed into the card loading position when the solenoid is driven. Further, if the locking pin could not be removed from the receptacle after the optical card has been fully inserted into the shuttle due to the malfunction of the solenoid, the shuttle could not be moved in the track direction, and thus the recording and/or reproducing operation could not be carried out at all.

SUMMARY OF THE INVENTION

The present invention has for its object to provide a novel and useful optical information recording and/or reproducing apparatus comprising a shuttle for carrying an optical record medium with respect to a recording and/or reproducing optical head, in which the shuttle can be indexed at a predetermined record medium loading position for inserting the optical record medium into the shuttle so that the optical record medium can be positively and correctly inserted into the shuttle.

According to the invention, an optical information recording and/or reproducing apparatus comprises:
- a movable means for carrying an optical record medium thereon;
- an optical head for projecting a recording and/or reproducing light beam onto the optical record medium placed on the movable means to perform information recording and/or reproduction;
- an optical record medium loading means for inserting the optical record medium into the movable means;
- a driving means for moving the movable means with respect to said optical head; and
- a control means for controlling said driving means such that said movable means is driven into a predetermined position by said driving means when said optical record medium is inserted into said movable means by said optical record medium loading means.

According to the invention, since the supporting means is controlled by the driving means even when the optical record medium is inserted into the supporting means such that the supporting means is electrically driven into the predetermined position at which the optical record medium is inserted into the supporting means, so that the optical record medium can be always correctly inserted into the supporting means and the supporting means can be positively and promptly moved after the optical record medium has been completely inserted into the supporting means.

DESCRIPTION OF THE PREFERRED EMBODIMENTS

Figure 5:
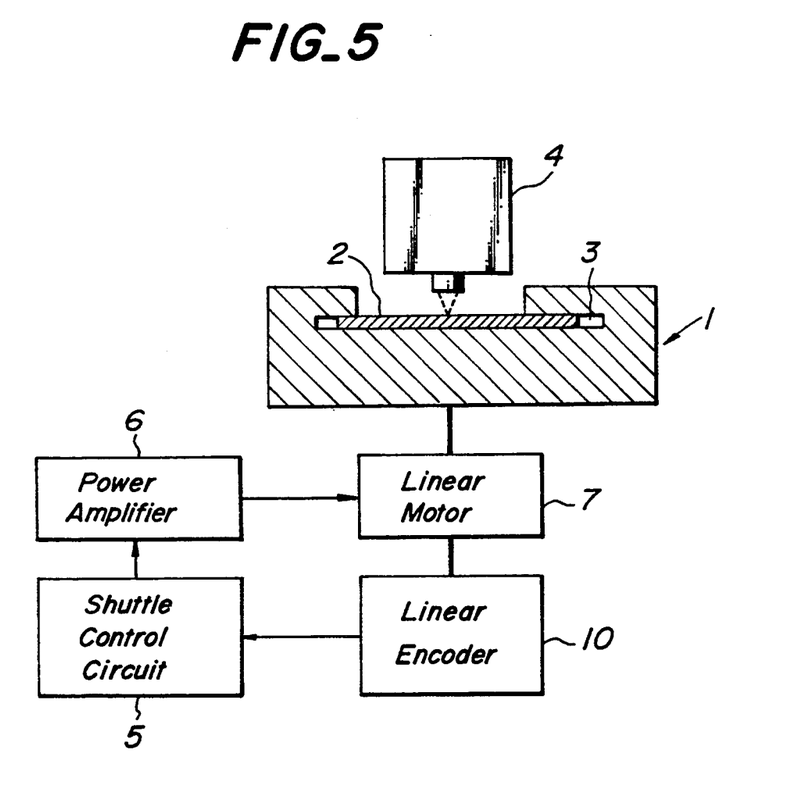
FIG. 5 is a schematic view showing the construction of an embodiment of the optical information recording-reproducing apparatus according to the invention.

FIG. 5 is a schematic view showing the construction of an embodiment of the optical information recording-reproducing apparatus according to the invention. A shuttle 1 for carrying an optical card 2 has an optical card receiving member 3 formed therein. Above the optical card receiving member 3 of the shuttle 1 there is arranged an optical head 4 for projecting a reading-writing light beam onto the optical card. After the optical card 2 has been inserted into the shuttle 1, the shuttle is moved in a track direction at a constant velocity and the reading-writing light beam is made incident upon a desired track on the optical card 2. Light reflected by the optical card 2 is received by the optical head 4 and is photoelectrically converted into an electric signal which represents information stored in the track of the optical card. In order to trace the desired track, the optical head 4 is moved in a direction perpendicular to the track direction by means of a suitable driving mechanism. However, this driving mechanism is not related to the subject matter of the present invention, it is not shown in the drawing.

In order to move the shuttle 1 in the track direction in a reciprocal manner, there is provided a linear motor 7 which is driven by a shuttle control circuit 5 via a power amplifier 6. Furthermore, in order to detect a position of the shuttle 1 with respect to the optical head 4 in the track direction, there is provided a linear encoder 10.

Figure 6:
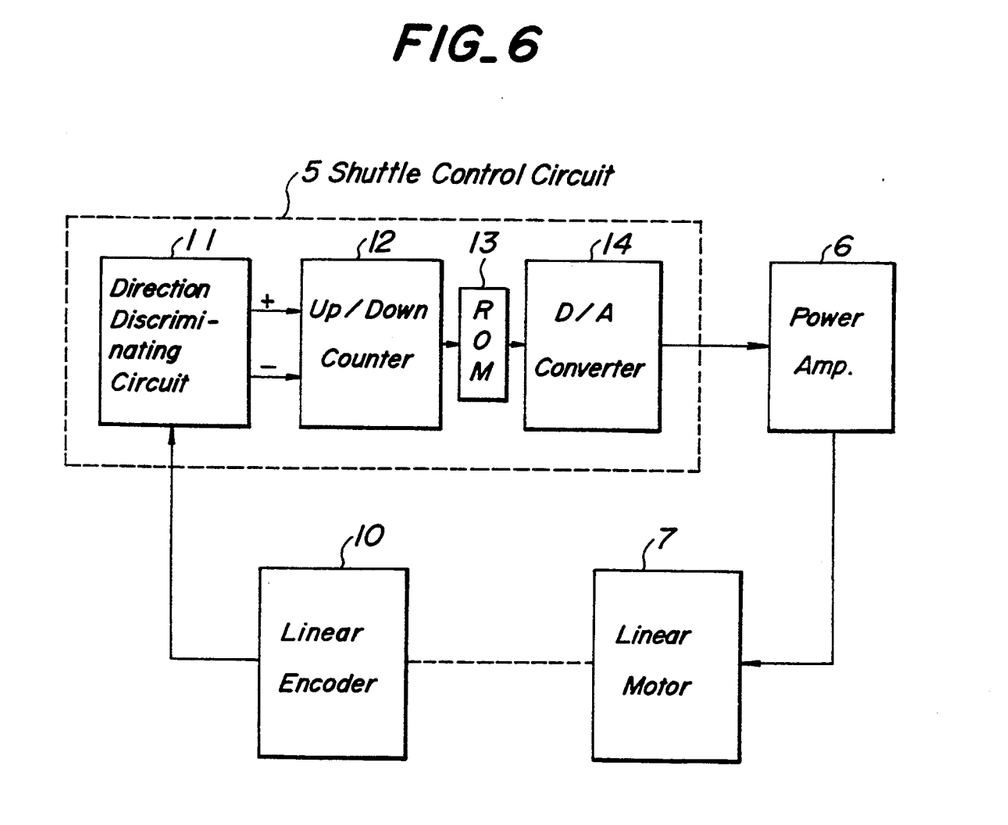
FIG. 6 is a block diagram depicting the construction of the control circuit shown in FIG. 5.
Figure 7:
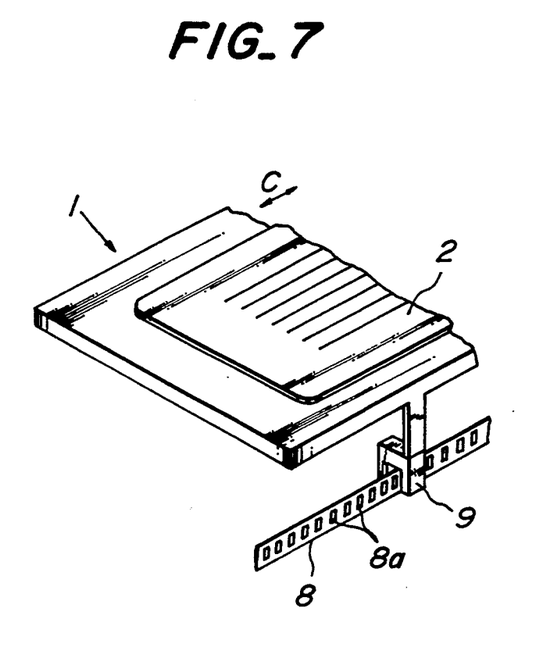
FIG. 7 is a perspective view illustrating the detailed construction of the linear scale.

FIG. 6 is a block diagram showing the detailed construction of the shuttle driving circuit, and FIG. 7 is a perspective view illustrating the detailed construction of the linear encoder 10. As shown in FIG. 7, the linear encoder 10 comprises a linear scale 8 extending in the track direction in which the shuttle 1 is reciprocally moved. In the linear scale 8 there are formed a number of recesses 8a which are equidistantly formed, each recess being extended in a direction perpendicular to the longitudinal direction of the linear scale. To the shuttle 1 there is secured a photodetector 9 including a light emitting diode and a set of phototransistors, the light emitting diode and the phototransistors being arranged on both sides of the linear scale such that light emitted by the light emitting diode transmitted through a recess 8a and is made incident upon the phototransistors. In this manner, each time the shuttle 1 is moved with respect to the linear scale 8, there are produced pulses from the set of photodetectors 9. Since the phototransistors are separated in the longitudinal direction of the linear scale 8 over a distance which is equal to a pitch of the recesses 8a, phases of the pulses generated by the phototransistors are shifted by 90° from each other. In the present embodiment, each time the shuttle is moved over a distance of 50 μm, the photodetector 9 generates one pulse. It should be noted that in the present embodiment, the photodetector 9 is secured to the shuttle 1 and the linear scale 8 is arranged stationary, but the photodetector may be arranged stationarily and the linear scale may be secured to the shuttle.

As shown in FIG. 6, the pulses generated by the photodetector 9 of the linear encoder 10 are supplied to a direction discriminating circuit 11 provided in the shuttle control circuit 5. As explained above, the phases of the pulses generated by the phototransistors are shifted by 90 degrees, and thus the direction discriminating circuit 11 can detect the moving direction of the shuttle by checking front edges of these pulses. That is to say, when the shuttle 1 is moved in a forward direction, i.e. a direction far away from the position at which the optical card is inserted into the shuttle, the direction discriminating circuit 11 generates a pulse at its first output terminal, but when it is judged that the shuttle is moved in a backward direction opposite to the forward direction, the circuit produces a pulse at a second output terminal. Output pulses produced at the first output terminal of the direction discriminating circuit 11 are then supplied to an up-count input terminal of an up-/down counter 12 such that the pulse are counted-up and output pulses generated at the second output terminal of the direction discriminating circuit are supplied to a down-count input terminal of the up-down counter so that these pulses are counted-down. In this manner, the moving direction as well as the moving amount of the shuttle can be detected by counting the pulses generated by the direction discriminating circuit.

An output signal of the up-down counter 12 is supplied to a red only memory (ROM) 13 as an address signal. In the ROM 13 there are stored data representing the relationship between the count value and a driving signal for the linear motor 7. That is to say, the data stored in the ROM 13 represents relationship between the count values and plural sets of directions and intensities of the driving current. For instance, the intensity of the driving current is gradually increased in accordance with the increase of the count values. When a count value of the up-down counter 12 is 3, data representing the direction and intensity of the driving current corresponding to the count value of 3 is selectively read out. The thus read out data is converted by a digital-analog converter 14 into a driving current having a desired polarity and a desired amplitude. The driving current thus produced by the digital-analog converter 14 is then amplified by the power amplifier 6, and the amplified driving current is supplied to a moving coil of the linear motor 7, so that the shuttle is moved toward the card loading position. Then, the count value is decreased by one and new data denoting the direction and amount of the driving current corresponding to the count value of 2 is read out of the ROM 13 and the linear motor 7 is driven by the thus read out data. Next the shuttle is further moved toward the card loading position at a lower speed and the count value is further decreased by one. Then, new data corresponding to the count value of 1 is read out of the ROM 13. It should be noted that the amplitude of the driving signal is lower than that at the count value of 2. Therefore, the linear motor 7 is further driven in accordance with this new data at a further reduced velocity. When the shuttle is driven into the card loading position, the count value becomes zero and no driving current is supplied to the linear motor 7. In this manner, it is possible to drive the shuttle into the desired position positively without producing an undesired overshoot. However, if the shuttle is moved beyond the card loading position, the above operation is performed.

The above explained operation is repeated to position the shuttle 1 into the predetermined position at which the optical card 2 is inserted into the shuttle. That is to say, even if the shuttle is moved in the forward direction due to the frictional force generated between the optical card and the pushing plate and holding plate during the inserting operation of the optical card 2 into the shuttle 1, this movement of the shuttle 1 is detected and the linear motor 7 is driven such that the shuttle is moved into the predetermined position. Further, when the shuttle is moved out of the predetermined position by external force such as vibration, the shuttle is indexed at the predetermined position by the linear motor 7. Therefore, the optical card can be always correctly inserted into the shuttle.

In the ROM 13 of the shuttle control circuit 5 there are further stored data for driving the shuttle at the constant velocity and data for stopping the shuttle at two standby positions at which the light beam is made incident upon the optical card at portions outside a record region. At these standby positions, the so-called seek operation can be initiated at once by moving the optical head in the direction perpendicular to the track direction. In this case, when the card loading position is set to one of the two standby positions which is closer to the card inserting inlet of the apparatus, the seek operation can be started immediately after the card inserting operation has been completed, so that the access time can be shortened.

When the recording and/or reproducing is performed, the shuttle 1 is moved in the track direction at a constant velocity by means of the linear motor 7 and the writing and/or reading light beam is made incident upon a desired track on the optical card 2. After the recording and/or reproducing for the desired track has been completed, the optical head 4 is moved in the direction perpendicular to the track direction such that the light beam is made incident upon a next desired track and then the shuttle 1 is moved again in the track direction. In this manner, the information can be recorded on desired tracks on the optical card or the information recorded on the desired tracks can be read out.

In the present embodiment, during the inserting operation of the optical card into the shuttle, even if the shuttle is moved out of the predetermined card loading position, the movement of the shuttle is detected and the shuttle is moved back into the desired position by driving the linear motor. Therefore, the shuttle is electrically locked at the card loading position, so that the optical card can be correctly inserted into the shuttle. When the optical card has been fully inserted into the shuttle, the switch is made off and the optical card inserting mechanism is deenergized. Then, the shuttle having the optical card inserted therein can be moved in the track direction in a prompt manner or the seek operation can be initiated immediately after the optical card has been inserted into the shuttle.

After the recording and/or reproducing has been finished, the shuttle is moved in to the predetermined card unloading position and the optical card can be taken out of the shuttle. Usually the card unloading position is the same as the card loading position, but they may be set at different positions. During this operation, the shuttle is electrically locked at the desired position, and thus the optical card can be removed from the shuttle in a positive manner.

Figure 8:
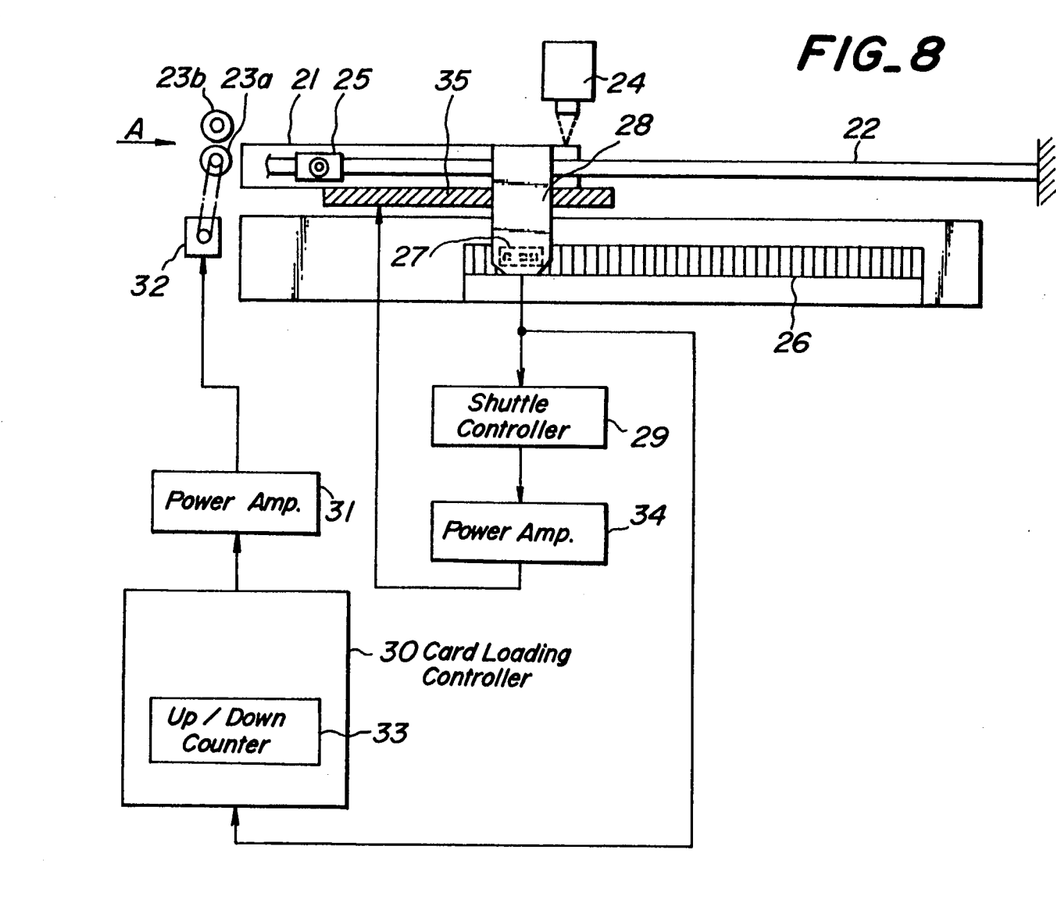
FIG. 8 is a schematic view representing the construction of another embodiment of the optical information recording-reproducing apparatus according to the invention.

FIG. 8 is a schematic view showing another embodiment of the optical information recording-reproducing reproducing apparatus according to the invention. In the above explained embodiment, there is not provided the mechanical locking means for locking the shuttle at the optical card inserting position. In the present embodiment, there is provided such a mechanical locking means. A shuttle 21 is slidably guided by a guide member 22 secured to a housing of the apparatus, so that the shuttle can be freely moved in the track direction. Into the shuttle 21 an optical card is to be inserted from a direction shown by an arrow A by means of an optical card driving means including driving roller 23a and guide roller 23b. Above the shuttle 21 is arranged an optical head 24 which is provided movably in a direction perpendicular to the track direction. On the side wall of the shuttle 21 there is secured a locking pin receptacle 25 in which a recess for receiving a locking pin not shown is selectively inserted. The locking pin is driven by a solenoid also not shown. When the optical card is inserted into the shuttle 21, the solenoid is energized and the locking pin is inserted into the recess of the receptacle 25. In this manner, the shuttle 21 is mechanically locked at the optical card inserting position.

In order to detect the movement of the shuttle 21 in the track direction, a linear scale 26 is provided along the moving path of the shuttle. To the shuttle 21 there is secured a photodetector 27 by means of a projection 28. The linear scale 26 includes a number of grids formed by reflecting stripes and non-reflecting stripes which are arranged alternately viewed in the longitudinal direction of the linear scale at a regular pitch. The photodetector 27 includes a light emitting diode for projecting light onto the linear scale 26 and photoelectric converting elements for receiving light reflected by the linear scale. The photoelectrically converting elements are shifted in the longitudinal direction of the linear scale by such a distance that they produce pulses having phase difference of 90 degrees. In this manner, the linear scale 26 and photodetector 27 constitute a linear encoder. The pulses generated by the photodetector 27 are supplied to a shuttle control circuit 29 as well as to a card loading control circuit 30.

The optical card driving roller 23a is driven by the card loading control circuit 30 via a power amplifier 31 and a card loading motor 32. The card loading control circuit 30 includes an up-down counter 33 for counting the pulses generated by the photo-detector 27 of the linear encoder. That is to say, the card loading control circuit 30 receives the count value of the up-down counter 33 and generates a card driving signal in response to the direction and amount of the shift of the shuttle 21 with respect to the card loading position.

The shuttle control circuit 29 receives the pulses generated from the linear encoder and detects a current position of the shuttle 21 and produces a shuttle driving signal. The thus generated shuttle driving signal is amplified by a power amplifier 34 and then is supplied to a linear motor 35 for moving the shuttle in the track direction. During the recording and reproducing, the shuttle control circuit 29 functions to drive the shuttle at a predetermined constant velocity such that the light beam scans a track at the constant velocity. After the recording and reproducing, the shuttle control circuit 29 generates a such shuttle driving signal that the shuttle is stopped at a predetermined standby position and is prepared for a next moving in the reverse direction. When such a control is not effected, the shuttle might be moved due to external force such that the light beam is not made incident upon the optical card.

Figure 9:
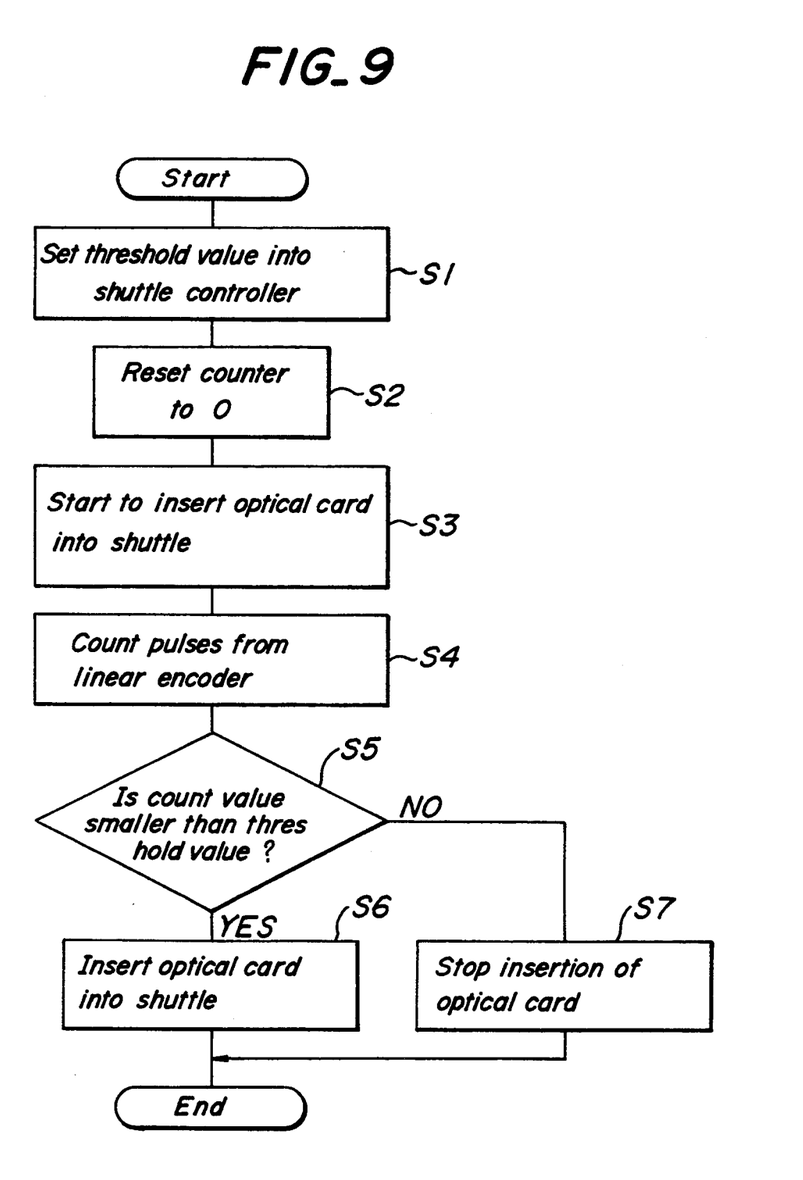
FIG. 9 is a flow chart explaining the operation of the apparatus illustrated in FIG. 8.

FIG. 9 is a flow chart for explaining the operation of the apparatus in a case that the optical card is inserted into the shuttle. At first, a given threshold count value is set in the card loading control circuit 30 from a system control circuit for controlling the whole operation of the optical card processing apparatus (S1). This threshold count value is determined in accordance with a maximum permissible distance of the movement of the shuttle from the card loading position during the card loading operation. That is to say, when the optical card is inserted into the shuttle, even if the shuttle is moved over a distance not longer than 200 $\mu$m, the optical card can be correctly loaded into the shuttle and the recording and reproducing can be performed correctly. In the present embodiment, the maximum permissible amount is 200 $\mu$m, and thus the threshold count value is set to 4, because one pulse corresponds to 50 $\mu$m.

In a next step S2, the up-down counter 33 of the card loading control circuit 30 is reset to zero. Then, the card loading motor 32 is driven by the card loading control circuit 30 to initiate the insertion of the optical card into the shuttle 21 (S3). At the same time, the up-down counter 33 starts to count pulses generated by the photodetector 27 of the linear encoder and the count value of the counter 33 is monitored in the card loading control circuit 30 (S4). During this card loading operation, when the shuttle 21 is positively locked by the mechanical locking mechanism including the locking pin and pin receptacle 25, the shuttle 21 is not moved, so that the count value of the up-down counter 33 is remained zero. The count value of the up-down counter 33 is compared with the threshold count value set in the card loading control circuit 30 (S5). When the count value of the counter 33 is smaller than or equal to the threshold count value, it is judged that the shuttle is in a normal range and the card loading operation is continued and after the optical card has been fully inserted into the shuttle 21, the card loading operation is completed (S6).

When the count value of the counter 33 exceeds the threshold count value, it is judged that the shuttle is moved over a impermissible long distance. Then, the card loading control circuit 30 functions to stop the generation of the driving signal to the card loading motor 32, and thus the card loading operation is stopped (S7). In the present embodiment, when the shuttle is moved over the predetermined long distance, the card loading operation is stopped by stopping the card loading motor, but the card loading motor may be driven in the reverse direction to discharge the optical card out of the shuttle. Furthermore, in the above embodiment, there is provided the mechanical locking means for locking the shuttle at the predetermined card loading position, however according to the invention, it is also possible to electrically lock the shuttle at the card loading position as in the same manner of the embodiment illustrate in FIGS. 5 to 7. Also in this case, when the shuttle is moved over the predetermined distance due to any reason, the card loading operation is stopped.

As explained above, in the optical information recording and/or reproducing apparatus according to the invention, the shuttle for carrying the optical record medium is controlled by the linear motor for moving the shuttle in the track direction during the optical record medium loading operation such that the supporting means is electrically driven into the predetermined record medium loading position at which the optical record medium is inserted into the supporting means, so that the optical record medium can be always correctly inserted into the supporting means and the supporting means can be positively and promptly moved after the optical record medium has been completely inserted into the supporting means. Moreover, when it is detected that the shuttle is moved over the predetermined long distance, the record medium loading operation is stopped, and thus the optical record medium can be inserted into the shuttle correctly.

According to the invention, since the shuttle controlling means for moving the shuttle in the track direction during the recording and reproducing is used to control the shuttle during the record medium loading operation, the whole construction of the apparatus becomes simpler and less expensive.

Moreover, in the embodiment of the apparatus according to the invention in which the mechanical locking means is not provided, the shuttle can be moved in the track direction immediately after the optical record medium has been inserted into the shuttle, so that the recording and/or reproduction can be performed promptly. Particularly when the card loading position is set to the standby position, after the optical card has been inserted into the shuttle, the recording or reproducing operation can be initiated at once.

What is claimed is:

1. An optical information recording and/or reproducing apparatus comprising:
   a movable means for carrying an optical record medium thereon;
   an optical head for projecting a recording and/or reproducing light beam onto the optical record medium placed on the movable means to perform information recording and/or reproduction;
   an optical record medium loading means for placing the optical record medium on the movable means;
   a driving means for moving the movable means with respect to said optical head; and
   a control means for controlling said driving means such that said movable means is driven into a predetermined card loading position by said driving means prior to placement of said optical record medium on said movable means by said optical record medium loading means.

2. An apparatus according to claim 1, wherein said movable means includes a supporting means for carrying an optical card having a plurality of tracks which are extended in parallel with each other in a track direction, said driving means comprises a slider of a linear motor for moving said supporting means in the track direction, and said control means is constructed such that the supporting means is driven by an electromagnetic force into said card loading position at which the optical card is placed on the supporting means during an operation for placing the optical card on the supporting means.

3. An apparatus according to claim 2, wherein said control means comprises a linear encoder for generating pulses in accordance with the position of the supporting means, an up-down counter for counting said pulses generated by said linear encoder to produce a count value which represents a deviation of the supporting means from the card loading position, and a driving signal generating means for producing a driving signal on the basis of the count value of the up-down counter, said driving signal being supplied to said linear motor to move the supporting means into the card loading position.

4. An apparatus according to claim 3, wherein said driving signal generating means comprises a read only memory for storing data which represents a mutual relationship between the count value of said up-down counter and a direction and an amount of the driving signal and producing a digital driving signal and a digital-analog converter for converting the digital signal into an analog driving signal, said analog driving signal being supplied to said linear motor.

5. An apparatus according to claim 4, wherein said read only memory stores data for stopping the supporting means at two standby positions at which the light beam is made incident on a portion on the optical card outside a data record region.

6. An apparatus according to claim 5, wherein said card loading position is set to one of said two standby positions which is situated at an upstream position viewed in a direction in which the optical card is moved while it is being placed on the supporting means.

7. An apparatus according to claim 3, wherein said control means comprises direction discriminating means for determining a direction of movement from a signal output by said linear encoder and for controlling said up-down counter to count said pulses up or down on the basis of said direction of movement.

8. An apparatus according to claim 3, wherein said linear encoder comprises:
   a linear scale extending in said track direction and having a plurality of equidistantly spaced recesses; and
   a photodetector attached rigidly to said supporting means to be movable with said supporting means alongside said linear scale;
   whereby as said supporting means moves, said photodetector detects at least some of said recesses to produce said pulses.

9. An apparatus according to claim 4, wherein said read only memory stores a threshold value indicating a maximum permissible deviation of said supporting means from said card loading position for card loading, and wherein placement of said optical card on said supporting means is stopped when said supporting means is deviated from said card loading position by a distance exceeding said threshold value.

* * * * *